United States Patent
Bothos et al.

(10) Patent No.: US 8,873,399 B2
(45) Date of Patent: Oct. 28, 2014

(54) GATEWAY NETWORK ELEMENT, A METHOD, AND A GROUP OF LOAD BALANCED ACCESS POINTS CONFIGURED FOR LOAD BALANCING IN A COMMUNICATIONS NETWORK

(75) Inventors: Euthimios Bothos, Athens (GR); Vesa Pauli Hellgren, Helsinki (FI); Alexandros Triantafillou, Athens (GR)

(73) Assignee: Nokia Siemens Networks Oy, Espoo (FI)

( * ) Notice: Subject to any disclaimer, the term of this patent is extended or adjusted under 35 U.S.C. 154(b) by 209 days.

(21) Appl. No.: 13/062,060

(22) PCT Filed: Sep. 3, 2008

(86) PCT No.: PCT/EP2008/061620
§ 371 (c)(1),
(2), (4) Date: Mar. 3, 2011

(87) PCT Pub. No.: WO2010/025766
PCT Pub. Date: Mar. 11, 2010

(65) Prior Publication Data
US 2011/0164504 A1    Jul. 7, 2011

(51) Int. Cl.
*H04L 12/26* (2006.01)
*H04L 12/801* (2013.01)
*H04W 28/08* (2009.01)
*H04L 12/803* (2013.01)

(52) U.S. Cl.
CPC ............... *H04W 28/08* (2013.01); *H04L 47/14* (2013.01); *H04L 47/125* (2013.01)
USPC ........................... 370/237; 709/218; 709/219

(58) Field of Classification Search
USPC ................................ 370/237, 395.53, 53, 395
See application file for complete search history.

(56) References Cited

U.S. PATENT DOCUMENTS

| | | | |
|---|---|---|---|
| 7,487,243 B1 * | 2/2009 | Zielinski et al. | 709/226 |
| 2005/0122942 A1 | 6/2005 | Rhee et al. | |
| 2007/0258465 A1 * | 11/2007 | Ma et al. | 370/395.53 |
| 2008/0075041 A1 * | 3/2008 | Jen | 370/329 |

OTHER PUBLICATIONS

Nokia Siemens Networks—Flexi Intelligent Service Node—Jul. 2007.*

* cited by examiner

*Primary Examiner* — Anh-Vu Ly
*Assistant Examiner* — Hashim Bhatti
(74) *Attorney, Agent, or Firm* — Laurence A. Greenberg; Werner H. Stemer; Ralph E. Locher

(57) ABSTRACT

The present invention refers to providing of a load balancing, by use of a gateway network element comprising a group of load balanced access points. In particular, the load balancing is performed by selecting of an access point from said group of load balanced access points by use of an access point name, which is derived from a packet data protocol context activation request, said packet data protocol context activation request being transmitted by a mobile subscriber or node, respectively, and received by the gateway network element.

18 Claims, 3 Drawing Sheets

GATEWAY NETWORK ELEMENT, A METHOD, AND A GROUP OF LOAD BALANCED ACCESS POINTS CONFIGURED FOR LOAD BALANCING IN A COMMUNICATIONS NETWORK

A gateway network element, a method, and a group of load balanced access points configured for load balancing in a communications network

FIELD OF THE INVENTION

The present invention relates to load balancing in a communications network. In particular, the present invention relates to a gateway network element configured to perform load balancing, a method for load balancing, a group of load balanced access points, a computer program product, and/or a data carrier comprising said computer program product.

BACKGROUND OF THE INVENTION

When the number of subscribers for a specific service in a communications network increases, load balancing becomes a crucial issue. Here, an increasing number of tasks have to be spread as effective as possible between network devices provided in a limited number in a communications network and configured to perform the corresponding tasks.

Application servers can handle a predetermined maximum amount of users. However, this predetermined maximum amount of users is less than the number of subscribers, to which a communications network can provide access in general. When considering public land mobile networks (PLMN), for example, a PLMN operator owns gateway support nodes like Gateway GPRS Support Nodes (GGSNs), which represent interfaces between external networks and the PLMN and which are capable of serving thousands or millions of subscribers. These gateway support nodes are interfaces to application servers and provide services to the subscribers by using connections to the application servers. However, on the other hand, application servers (e.g., WAP (Wireless Application Protocol) gateways, MMS (Multimedia Messaging Service) servers etc.) can not handle requests coming from such a large amount of subscribers.

Thus, load balancing mechanisms are necessary to avoid service outages. Even in cases, where clustering or other internal server load balancing mechanisms are deployed, those mechanisms are not sufficient for handling of the steadily increasing load.

When considering PLMNs, a mobile subscriber or mobile node, respectively, activates packet data protocol (PDP) contexts toward gateway network elements, which are configured to provide access to other networks such as internet, corporate networks or services of the operator, for example. Such a gateway network element can be, for example, a legacy GGSN as defined by the 3$^{rd}$ Generation Partnership Project or an intelligent node with service awareness/switching capabilities such as the Flexi Intelligent Service Node (ISN), for example.

A gateway network element provides access to Packet Data Networks (PDNs). The GGSN is selected by an Access Point Name (APN), which is provided either by the subscriber itself (e.g., it is configured explicitly in the equipment of a mobile node) or by a Home Location Register (HLR). In FIG. 1 the activation of a PDP context as mentioned above is shown exemplary. In FIG. 1, a subscriber or mobile node 10, respectively, transmits a PDP context activation request 13 through its access and core network 11 to a GGSN 12. The GGSN 12 responsible for providing access to PDNs and identified by APN creates a PDP context response message and transmits this message 14 to the mobile node 10.

As regards load balancing of GGSNs, the load balancing can be achieved, for example, by use of external routers or other network elements, which act as "load balancers".

If several GGSN nodes are provided, it is possible that the same APN is served by several GGSN nodes. In such cases, the Serving GPRS Support Node (SGSN) will make a load balancing decision when it selects a GGSN. However, for application server load balancing, this approach is not sufficient, as a single GGSN node can still generate too much load for application servers and as GGSNs have higher capacity than server nodes providing applications.

Further, existing Gi load balancing solutions are not flexible enough. They usually involve presence of new network elements, which, in turn, increase OPEX and CAPEX. Thus, an integrated solution offered by a gateway node like GGSN of the PLMN is necessary.

One of existing prior art solutions exploits features of Flexi ISNs, in particular, of the GRE tunnelling feature. Here, the Flexi ISN can be connected to external servers using up to two GRE tunnels, which can be redundant. The Flexi ISN uses both tunnels (the normal and the redundant tunnel) actively. Here, when a new PDP context is activated, the tunnel having the least load is used. The load of a GRE tunnel is defined by a number of PDP contexts, which use the corresponding GRE tunnel. An operator can use the redundant tunnels for load balancing by connecting each of them to a separate application server. This solution of prior art is visualised by FIG. 2. In FIG. 2, a SGSN 20 selects a Flexi ISN 21 and transmits a PDP context activation request to the Flexi ISN 21. The AP 210 comprised in Flexi ISN 21 provides connections to application servers 24_1 and 24_1 by corresponding GRE tunnels 22_1 and 22_2, wherein the messages transmitted to the WAP servers 24_1 and 24_1 have to pass the corresponding firewalls 23_1 and 23_2. After activation of a PDP context the AP 210 and, thus, the Flexi ISN 21 uses the least loaded GRE tunnel 22_1, 22_2 to provide services to the corresponding subscriber or mobile node, respectively.

However, when this solution is successful for load balancing for two external application servers, problems arise when a load balancing for more than two servers is required. Further, also cases are possible, in which a GRE tunnelling is not wanted or preferred.

Moreover, also other problems can arise with regard to the above described solution of prior art. The Gi interface, being an interface between the Flexi ISN and the PDN and defended by 3GPP, groups a variety of dependent functions together and the load balancing method has to consider these dependencies. Thus, for example, a RADIUS (Remote Authentication Dial In User Service) accounting protocol is used to inform a WAP server about the status of PDP contexts. Here, the load balancing mechanism has additionally to be able to select the right RADIUS accounting server when the GRE tunnel is selected.

SUMMARY OF THE INVENTION

Object of the present invention is providing of an improved load balancing mechanism.

This object is achieved by a gateway network element configured to perform load balancing, a method for load balancing, a group of load balanced access points a computer program product, and/or a data carrier.

Further embodiments of the present invention are provided with the corresponding dependent claims.

The object of the present invention is achieved by a gateway network element configured to perform load balancing, said gateway network element comprising:
- a group of load balanced access points;
- a receiving module configured to receive a packet data protocol context activation request, said packet data protocol context activation request comprising an access point name; and
- a selecting module configured to select an access point from said group of load balanced access points by use of said access point name.

According to the present invention, the wording "load balanced access points" means that loads of the access points (comprised in the group) are divided between the access points. E.g., if a group of load balanced access points comprises two access points AP1 and AP2, it can be preconfigured that the AP1 can be loaded, e.g., with 60% of the active contexts while the AP2 can then be loaded with 40% of the active contexts.

According to an embodiment of the present invention, to each access point of the group of load balanced access points a load weight is assigned.

According to an embodiment of the present invention, the load weight indicates a percentage of active contexts, which an access point, said load weight is assigned to, can manage.

According to an embodiment of the present invention, the load weight is a configurable load weight.

According to an embodiment of the present invention, the group of load balanced access points is a configurable group. According to the embodiment of the present invention, adding, removing, and modifying of access points comprised in the group of load balanced access points is possible. Thus, a flexible handling of the group of load balance access points is enabled by the present invention.

According to an embodiment of the present invention, access points comprised in said group of load balanced access points have an identical part of configuration. According to this embodiment of the present invention, configurations of access points belonging to the load balanced group are partially identical. Thus, consistency between the corresponding access points is ensured. Furthermore, a flexible handling of configurations is enabled by the present invention as several, e.g., important configuration options may also vary between the corresponding access points.

According to an embodiment of the present invention, the selecting module is configured to select an access point from the group of load balanced access points if the access point name is linked to the group of load balanced access points.

According to an embodiment of the present invention, the selected access point is the least loaded access point in the group of load balanced access points.

According to an embodiment of the present invention, the selected access point is the least loaded access point in the group of load balanced access points with regard to a load weight assigned to the selected access point.

According to a further embodiment of the present invention, the gateway network element comprises a serving module configured to provide services to a mobile node by use of a connection between the selected access point and an application server. The mobile node corresponds to mobile node, which transmitted the packet data protocol context activation request to the gateway network element.

According to an embodiment of the present invention, each of access points of said group of load based access points is connected to a corresponding application server.

The gateway network element can be, for example, a Gateway GPRS Support Node, an intelligent node with service awareness and switching capabilities, or a Flexi Intelligent Service Node.

The object of the present invention is achieved also by a method for load balancing, said method comprising:
- receiving of a packet data protocol context activation request, said packet data protocol context activation request comprising an access point name; and
- selecting of an access point from a group of load balanced access points by use of said access point name, said group of load balanced access points being provided in a gateway network element.

According to an embodiment of the present invention, to each access point of the group of load balanced access points a load weight is assigned.

According to an embodiment of the present invention, the load weight indicates a percentage of active contexts, which an access point, said load weight is assigned to, can man-age.

According to an embodiment of the present invention, in said selecting, an access point is selected from the group of load balanced access points if the access point name is linked to the group of load balanced access points.

According to an embodiment of the present invention, in said selecting, an access point is selected, which is the least loaded access point in the group of load balanced access points.

According to an embodiment of the present invention, the selected access point is the least loaded access point in the group of load balanced access points with regard to a load weight assigned to the selected access point.

According to an embodiment of the present invention, the method comprises a providing of services to a mobile node by use of a connection between the selected access point and an application server. The mobile node corresponds to mobile node, which transmitted the packet data protocol context activation request The object of the present invention is achieved by a group of load balanced access points comprising at least one load balanced access point, wherein said group of load balanced access points is configured to be used for load balancing in a gateway network element, wherein in said load balancing an access point is selected from said group of load balanced access points by use of an access point name, wherein said access point name is derived from a packet data protocol context activation request received by said gateway network element.

The object of the present invention is achieved also by a computer program product comprising a code, wherein said code is configured to implement the method sketched above and described in more detail bellow.

According to an embodiment of the present invention, the code can be embodied on a data carrier.

According to an embodiment of the present invention, the computer program product can be configured to perform said method when the computer program product is executed by a processing unit like processor, for example.

The object of the present invention is achieved also by a data carrier comprising the computer program product.

Thus, the present invention refers to providing of a load balancing, by use of a gateway network element comprising a group of load balanced access points. In particular, the load balancing is performed by selecting of an access point from said group of load balanced access points by use of an access point name, which is derived from a packet data protocol context activation request, said packet data protocol context activation request being transmitted by a mobile subscriber or node, respectively, and received by the gateway network element.

The present invention provides an effective and flexible way of load balancing, wherein it is also ensured that a gateway node or gateway network element will not generate too much load in application servers connected to the gateway node or gateway network element. Further, the present invention enables an effective and flexible handling of several application servers.

Moreover, according to the present invention a flexible management of access points of a load balanced access point group is enabled. In particular, both configuration of the whole group and configuration of individual access points in the group is possible.

Furthermore, the load balancing in a group of load balanced access points can be managed by configurable load weights, wherein to each access point of the group a configurable load weight is assigned. In this way, a flexible load balancing is provided according to the present invention. Additionally, this weighted load balancing provides the possibility to disconnect one application server (e.g., when it is down) by setting the load weight to 0 for the access point connected to the application server. Thus, the weight values can be dynamically changed in dependence on the observed load of the application servers connected to access points of a group of load balanced access points.

BRIEF DESCRIPTION OF THE DRAWINGS

The present invention will be more clearly understood from the following description of embodiments of the invention read in conjunction with the attached drawings, in which.

DESCRIPTION OF THE EMBODIMENTS

According to the present invention, a load balancing is provided by use or a group of load balanced access points within a gateway network element like a Gateway GPRS Support Node, an intelligent node with service awareness and switching capabilities, or a Flexi Intelligent Service Node, for example.

Figure 1:
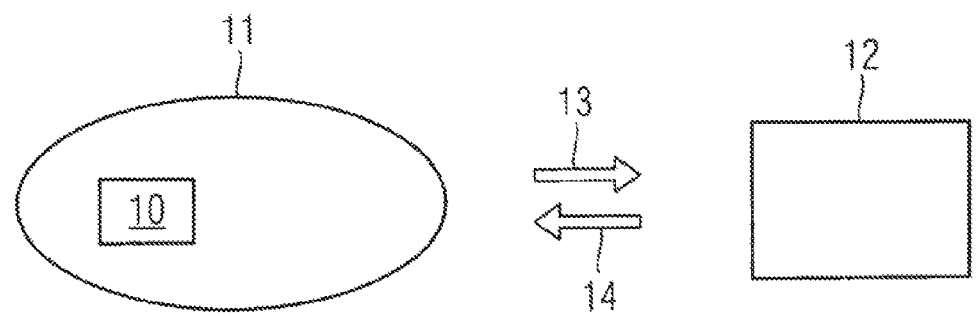
FIG. 1 shows an activation of a PDP context according to state of art.
Figure 2:
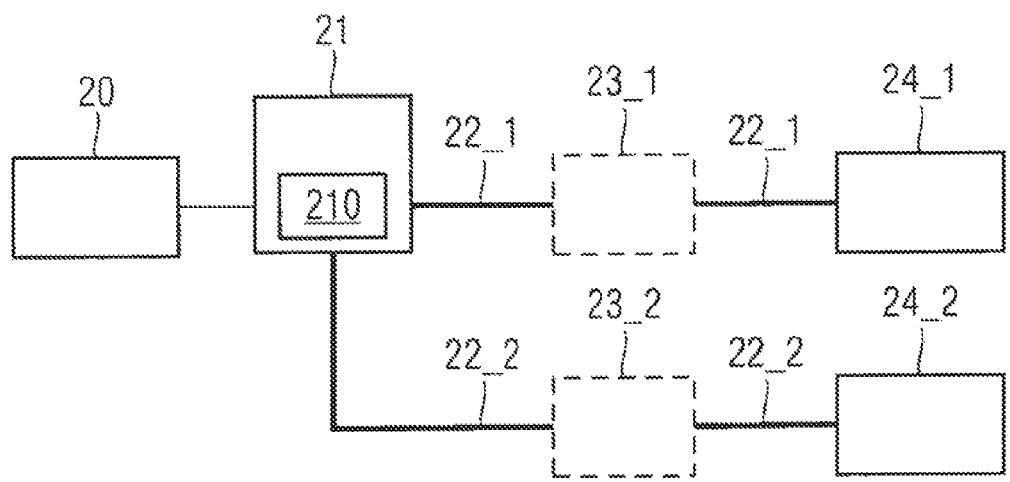
FIG. 2 shows a prior art solution for load balancing exploiting the GRE tunnelling feature of Flexi ISN.
Figure 3:
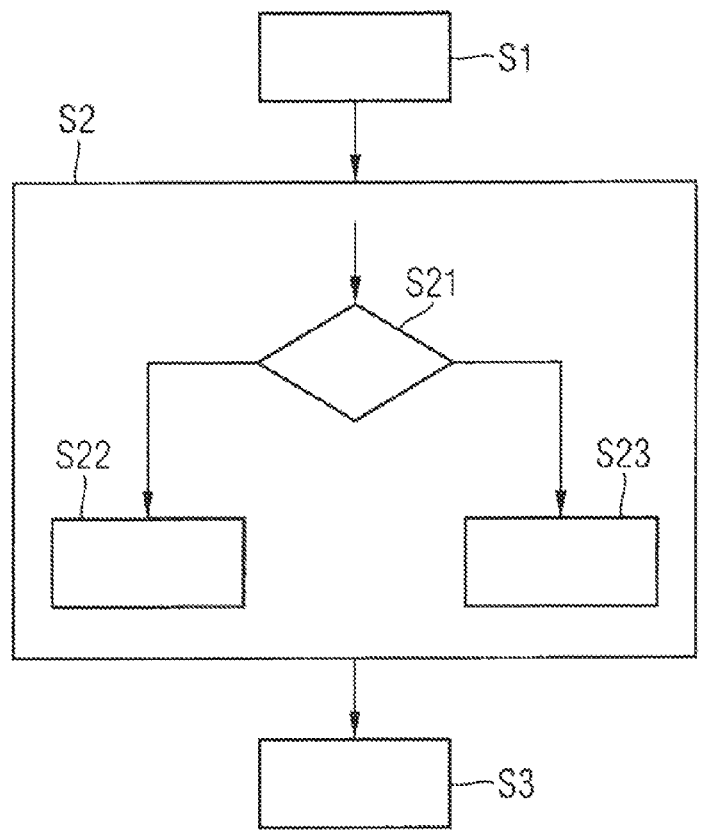
FIG. 3 shows steps of a method for load balancing according to an embodiment of the present invention.

FIG. 3 shows steps of a method for load balancing according to an embodiment of the present invention.

When a mobile subscriber or node, respectively, requests a PDP context activation with a specific APN, the gateway network element comprising a group of load balanced access points selects one of the access points belonging to the group of load balanced access points by use of the APN. Here, each access point inside the load balanced group can use a connection to a different application server.

According to FIG. 3, in step S1 a PDP context activation request with a specific APN is received. In step S2, an access point is selected from a group of load balanced access points by use of said access point name, said group of load balanced access points being provided in a gateway network element.

In particular, in step S21, it is checked whether the received APN is linked to the group of load balanced access points.

If there is a link between the group of load balanced access points and the received APN, an access point belonging to the group is selected in step S22. In particular, the selected access point will be such that it represents the least loaded access point in the group of load balanced access points. As according to the present invention, the access points may be weighted by (configurable) load weights, the selected access point will be in this case the least loaded access point with regard to a load weight assigned to this access point.

However, if there no link between the group of load balanced access points and the received APN is provided, the gateway network element or its corresponding selecting module, respectively, will select an access point, which corresponds to the received APN, in step S23.

After requested activation of the PDP context, services will be provided to the corresponding mobile subscriber or node, respectively, by use of a connection between the selected access point and the application server in step S3.

Figure 4:
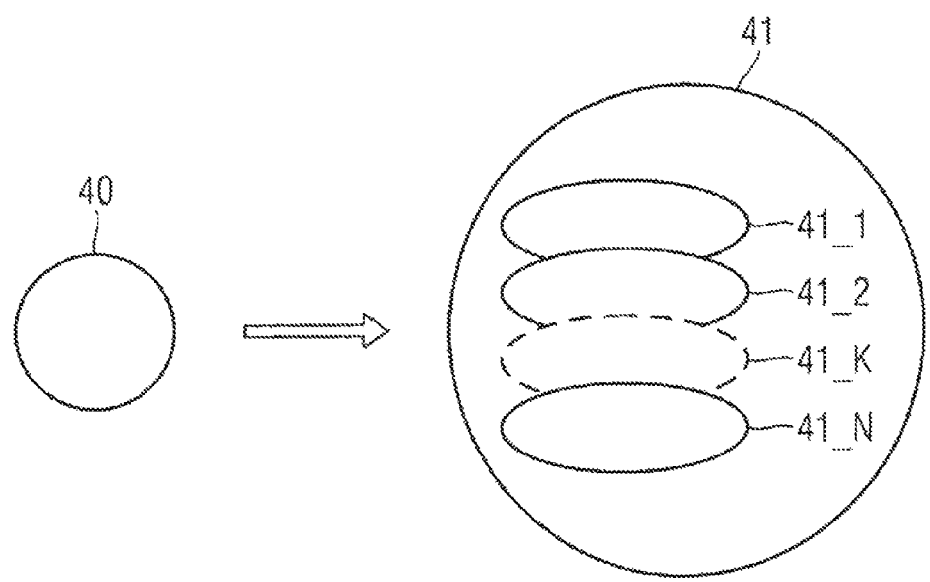
FIG. 4 shows a group of load balanced access points according to an embodiment of the present invention.

FIG. 4 shows a group 41 of load balanced access points 41_1, 41_2, 41_K, 41_N according to an embodiment of the present invention. According to the embodiment provided by FIG. 4, the group 41 is referenced by a single APN 40.

As already mentioned above, the load balancing can be based on configurable load weights for such access points 41_1, 41_2, 41_K, 41_N, which belong to a load balanced group 40. The load weights are configured such, that each load weight corresponds to one access point and indicates the percentage of load, which the corresponding access point can handle with regard to active contexts at maximum. Thus, for example, the access point 41_1 could be loaded with 40% of the active contexts while each of the further access points 41_2, 41_K, and 41_N can be loaded with 20% of active contexts.

According to the present embodiment, both the weights per access point 41_1, 41_2, 41_K, 41_N and the load balanced group 41 can be configurable. If the load weights of access points 41_1, 41_2, 41_K, 41_N are equal, round robin algorithm or an approach based on round robin algorithm can be applied when selecting an access point 41_1, 41_2, 41_K, 41_N from the group 41.

As already mentioned above, such weighted load balancing provides the possibility to disconnect one application server (e.g. when it is down) by setting a load weight to 0 for the access point 41_1, 41_2, 41_K, 41_N connected to the application server.

According to the present invention, the weight values can be dynamically changed depending on the observed load of the application servers.

It has to be noted, that each access point 41_1, 41_2, 41_K, 41_N is referenced with its APN. The relation of APNs to access points 41_1, 41_2, 41_K, 41_N is not negated with the present invention, but the APN is extended in order to be able to reference a group 41 of load balanced access points 41_1, 41_2, 41_K, 41_N.

The configuration of the access points 41_1, 41_2, 41_K, 41_N can be partly identical in order to ensure consistency, when needed. Here, it is not necessary to show parameters, which are not required for configuration of access points 41_1, 41_2, 41_K, 41_N, on the corresponding configuration page. Further, it is possible that several important configuration options of access points 41_1, 41_2, 41_K, 41_N will vary. Such configuration options are, for example, the authentication or tunnelling method.

Figure 5:
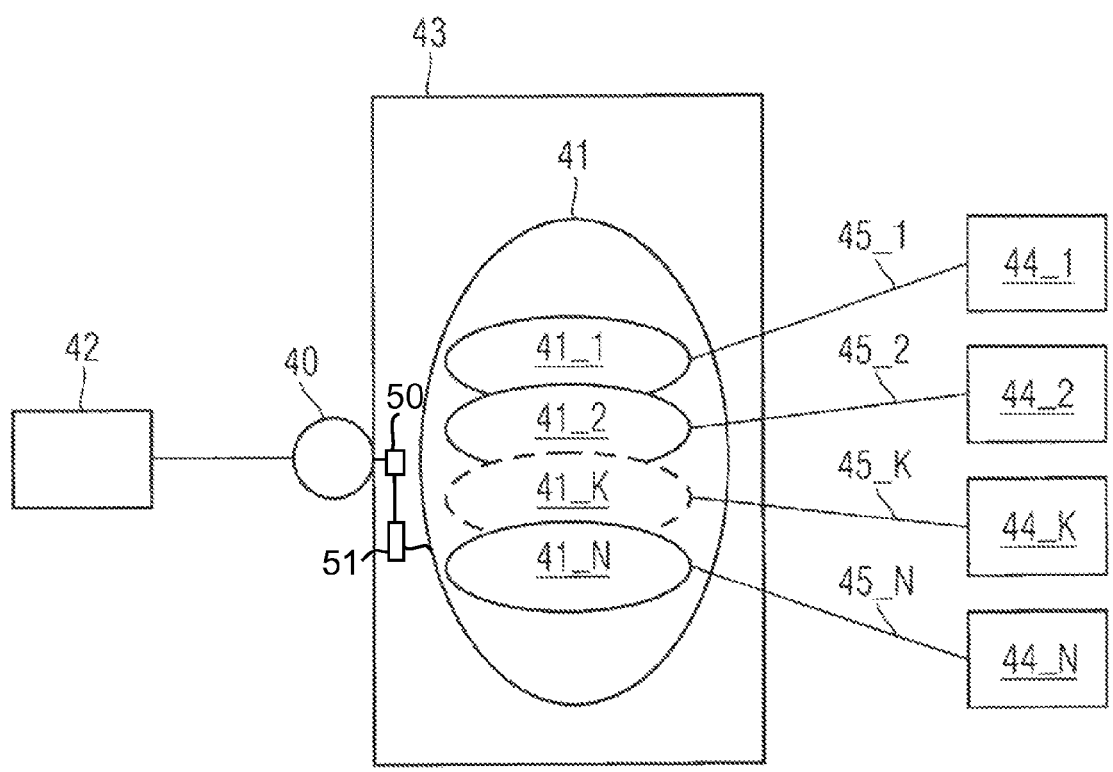
FIG. 5 shows a handling of load balancing according to an embodiment of the present invention.

FIG. 5 shows a handling of load balancing according to an embodiment of the present invention.

According to FIG. 5, when a mobile subscriber or node, respectively, transmits a PDP context activation request, the SGSN 42 selects a gateway network element 43 like Flexi ISN or GGSN, for example, and transmits the PDP context activation request to the gateway network element 43, wherein the PDP context activation request comprises an APN 40. The gateway network element 43 or its receiving module 50, respectively, receives the PDP context activation request comprising the APN 40. Then, the gateway network element 43 or its selecting module 51, respectively, selects an access point 41_1, 41_2, 41_K, 41_N from the group 41 of load balanced access points 41_1, 41_2, 41_K, 41_N by use of said access point name as described above with regard to FIG. 3.

According to the present embodiment, the group 41 of load balanced access points 41_1, 41_2, 41_K, 41_N comprised in the gateway network element 43 corresponds to the group 41 provided in FIG. 4.

Further, according to the present embodiment, each access point 41_1, 41_2, 41_K, 41_N inside the load balanced group 41 uses a connection 45_1, 45_2, 45_K, 45_N to a different application server 44_1, 44_2, 44_K, 44_N, like a WAP or MMS server, for example. According to the present embodiment, each connection 45_1, 45_2, 45_K, 45_N can belong to its own and separate Gi network.

Thus, when the PDP context is activated and a corresponding access point 41_1, 41_2, 41_K, 41_N connected to an application server 44_1, 44_2, 44_K, 44_N by a connection 45_1, 45_2, 45_K, 45_N is selected, services to the mobile subscriber or node, respectively, can be provided by use of the corresponding connection 45_1, 45_2, 45_K, 45_N between the selected access point 41_1, 41_2, 41_K, 41_N and an application server 44_1, 44_2, 44_K, 44_N.

By use of the present invention, the operator gets the option to allocate different application servers to different Gi networks. Consequently, each server can handle less traffic since subscribers are load balanced between the access points.

If operator needs to know, which of the load balanced access points has been selected, this information can be passed in new attributes over Ga (CDR, offline charging), Gi (RADIUS), Gx (DCCA, policy control and charfing rules), Gy (DCCA, online charging), and/or X2 (IRI data, lawful interception). Further, the selected load balancing APN can be used instead of the requested APN, when the APN value is passed in those interfaces.

Further, the present invention offers an easy way of performing maintenance in a Gi network without service downtime, which may correspond to a period of when new PDP contexts can not be activated. As long as a single load balanced access point is available behind the requested APN, the gateway network element like GGSN, for example, will be able to activate new PDP contexts. This is advantageous compared to existing prior art solutions, where performing changes in configurations of access points disables the access points and the related services and causes, thus, service downtime.

Thus, the present invention offers a load balancing with regard to several application servers. Further, a weighted load balancing is possible according to the present invention. Additionally, a differentiated configuration per APN in a group of load balanced access points is possible. Moreover, the present invention provides a general and generic way of load balancing, which is not restricted to 3GPP only.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims. It is therefore intended that the foregoing detailed description is to be regarded as illustrative rather than limiting and that it is understood that it is the following claims including all equivalents described in these claims that are intended to define the spirit and the scope of this invention. Nor is anything in the foregoing description intended to disavow the scope of the invention as claimed or any equivalents thereof.

REFERENCE LIST 10 a mobile node
11 access and core network
12 a GGSN
13 a PDP context activation request
14 a PDP context response message
20 a SGSN
21 a Flexi ISN
210 an AP
22_1 a GRE tunnel
22_2 a GRE tunnel
23_1 a firewall
23_2 a firewall
24_1 an application server
24_2 an application server
S1 receiving of a PDP context activation request
S2 selecting of an access point
S21 checking of the received APN
S22 selecting of an access point belonging to a group of load based access points
S23 selecting of an access point corresponding to the received APN
S3 providing of services by use of a connection between the selected access point and an application server
40 received APN
41 group of load balanced access points
41_1 load balanced access point
41_2 a load balanced access point
41_K a load balanced access point
41_N a load balanced access point
42 a SGSN
43 an a gateway network element
44_1 an application server
44_2 an application server
44_K an application server
44_N an application server
45_1 a connection between a load balanced access point and an application server
45_2 a connection between a load balanced access point and an application server
45_K a connection between a load balanced access point and an application server
45_N a connection between a load balanced access point and an application server

The invention claimed is:
1. A gateway network element configured to perform load balancing, the gateway network element comprising:
a group of load balanced access points, each of the access points of said group of load balanced access points being assigned a load weight, said load weight indicating a percentage of active contexts, which an access point, said load weight is assigned to, can manage, each access point of the group using a connection to a different application server;

a receiver for receiving a packet data protocol context activation request, the packet data protocol context activation request containing an access point name;

a selector for selecting an access point from said group of load balanced access points by use of the access point name; and the gateway network element configured to disconnect a particular application server by setting the load weight in the group to zero for the access point connected to the particular application server.

2. The gateway network element according to claim 1, wherein the load weight is a configurable load weight.

3. The gateway network element according to claim 1, wherein said group of load balanced access points is a configurable group.

4. The gateway network element according to claim 1, wherein the access points contained in said group of load balanced access points have an identical part of configuration.

5. The gateway network element according to claim 1, wherein said selector is configured to select the access point from said group of load balanced access points if the access point name is linked to said group of load balanced access points.

6. The gateway network element according to claim 1, wherein a selected access point is a least loaded access point in said group of load balanced access points.

7. The gateway network element according to claim 1, wherein a selected access point is a least loaded access point in said group of load balanced access points with regard to the load weight assigned to said selected access point.

8. The gateway network element according to claim 1, wherein the gateway network element is a Gateway GPRS Support Node.

9. The gateway network element according to claim 1, wherein the gateway network element is an intelligent node with service awareness and switching capabilities.

10. The gateway network element according to claim 1, wherein the gateway network element is a Flexi Intelligent Service Node.

11. A method for load balancing, which comprises the steps of:

receiving a packet data protocol context activation request, the packet data protocol context activation request containing an access point name;

selecting an access point from a group of load balanced access points by use of the access point name, the group of load balanced access points being provided in a gateway network element, each access point of the group using a connection to a different application server;

assigning to each of the access points of the group of load balanced access points a load weight, the load weight indicating a percentage of active contexts, which an access point, the load weight is assigned to, can manage; and disconnecting a particular application server by setting the load weight in the group to zero for the access point connected to the particular application server.

12. The method according to claim 11, wherein in the selecting step, selecting the access point from the group of load balanced access points if the access point name is linked to the group of load balanced access points.

13. The method according to claim 11, wherein in the selecting step, selecting the access point, which is a least loaded access point in said group of load balanced access points.

14. The method according to claim 11, wherein a selected access point is a least loaded access point in the group of load balanced access points with regard to a load weight assigned to the selected access point.

15. The method according to claim 11, which further comprises providing services by use of a connection between a selected access point and the application server.

16. A non-transitory computer-readable medium having computer-executable instructions to be executed via a processor for performing a method for load balancing, which comprises the steps of:

receiving a packet data protocol context activation request, the packet data protocol context activation request containing an access point name;

selecting an access point from a group of load balanced access points by use of the access point name, the group of load balanced access points being provided in a gateway network element, each access point of the group using a connection to a different application server;

assigning to each of the access points of the group of load balanced access points a load weight, the load weight indicating a percentage of active contexts, which an access point, the load weight is assigned to, can manage; and disconnecting a particular application server by setting the load weight in the group to zero for the access point connected to the particular application server.

17. The non-transitory computer-readable medium according to claim 16, further comprising a data carrier and said computer-executable instructions are embedded in said data carrier.

18. The non-transitory computer-readable medium according to claim 16, wherein the computer-readable medium is configured to perform the method when the computer-readable medium is executed by a computer having a processor.

* * * * *